US012618674B2

(12) United States Patent
Wu et al.

(10) Patent No.: US 12,618,674 B2
(45) Date of Patent: May 5, 2026

(54) INTERFEROMETRIC RESONATOR OPTICAL GYROSCOPE WITH OPTICAL FREQUENCY COMB

(71) Applicant: Honeywell International Inc., Charlotte, NC (US)

(72) Inventors: Jianfeng Wu, Tucson, AZ (US); Steven Tin, Edina, MN (US); Matthew Wade Puckett, Phoenix, AZ (US); Tiequn Qiu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 242 days.

(21) Appl. No.: 18/467,490

(22) Filed: Sep. 14, 2023

(65) Prior Publication Data

US 2025/0093158 A1     Mar. 20, 2025

(51) Int. Cl.
G01C 19/72         (2006.01)
G01C 19/66         (2006.01)
G02F 2/02          (2006.01)

(52) U.S. Cl.
CPC ......... G01C 19/727 (2013.01); G01C 19/661 (2013.01); G02F 2/02 (2013.01); G02F 2203/15 (2013.01); G02F 2203/56 (2013.01)

(58) Field of Classification Search
CPC .. G01C 19/721; G01C 19/725; G01C 19/727; G02F 2203/56
See application file for complete search history.

(56) References Cited

U.S. PATENT DOCUMENTS

| | | | |
|---|---|---|---|
| 10,741,989 B2 | 8/2020 | Kieu | |
| 2010/0290057 A1* | 11/2010 | Qiu | G01C 19/727 |
| | | | 356/461 |
| 2014/0152994 A1 | 6/2014 | Wu et al. | |
| 2019/0041215 A1* | 2/2019 | Sanders | G01C 19/726 |

(Continued)

FOREIGN PATENT DOCUMENTS

| | | |
|---|---|---|
| CN | 103941430 A | 7/2014 |
| CN | 103941430 B | 11/2016 |

(Continued)

OTHER PUBLICATIONS

Liu et al., "Reduction of relative intensity noise in a broadband source-driven RFOG using a high frequency modulation technique", Optics Letters, vol. 47, Issue 19, Sep. 27, 2022, pp. 5100 through 5103.

(Continued)

*Primary Examiner* — Michael A Lyons
(74) *Attorney, Agent, or Firm* — Fogg & Powers LLC

(57)           ABSTRACT

An interferometric resonator optical gyroscope includes an optical frequency comb generator configured to generate an optical frequency comb. Optical signals representative of the optical frequency comb pass through an optical resonator in different directions, and a rotation rate is determined based on the extent of interference between the optical signals. Parameters of the optical frequency comb generator can be controlled by a control servo based on an intensity of the optical signals after propagating in the optical resonator. Utilizing an optical frequency comb generator reduces the bias error during gyroscope operation.

10 Claims, 8 Drawing Sheets

(56)　　　　　　References Cited

U.S. PATENT DOCUMENTS

| | | | |
|---|---|---|---|
| 2019/0049249 A1 | 2/2019 | Wu et al. | |
| 2024/0377199 A1 * | 11/2024 | Wu | G01C 19/727 |
| 2025/0027772 A1 * | 1/2025 | Wu | G01C 19/72 |

FOREIGN PATENT DOCUMENTS

| | | | | |
|---|---|---|---|---|
| CN | 110006418 A | 7/2019 | | |
| CN | 109556593 B | 8/2020 | | |
| EP | 0538670 A1 * | 4/1993 | | G01C 19/727 |
| EP | 2972086 B1 | 1/2019 | | |
| EP | 3447466 B1 | 1/2020 | | |

OTHER PUBLICATIONS

Zhao et al., "Navigation-grade resonant fiber-optic gyroscope using ultra-simple white-light multibeam interferometry", Photonics Research, vol. 10, Issue 2, Feb. 1, 2022, pp. 542 through 549.
European Patent Office, "Extended European Search Report", dated Dec. 16, 2024, from EP Application No. 2418113.0, from Foreign Counterpart to U.S. Appl. No. 18/467,490, pp. 1 through 9, Published: EP.
Sumathi et al., Investigation of Bias Stability Enhancement using Frequency comb source in Resonant Fiber Optic Gyroscope, Optical and Quantum Sensing and Precision Metrology II, Proceedings of SPIE, vol. 12016, 12016T, Mar. 3, 2022, pp. 120160T-1 through 120160T-9.
European Patent Office, "Communication pursuant to Article 94(3)EPC", dated Aug. 22, 2025, from EP Application No. 24183113.0, from Foreign Counterpart to U.S. Appl. No. 18/467,490, pp. 1 through 5, Published: EP.

* cited by examiner

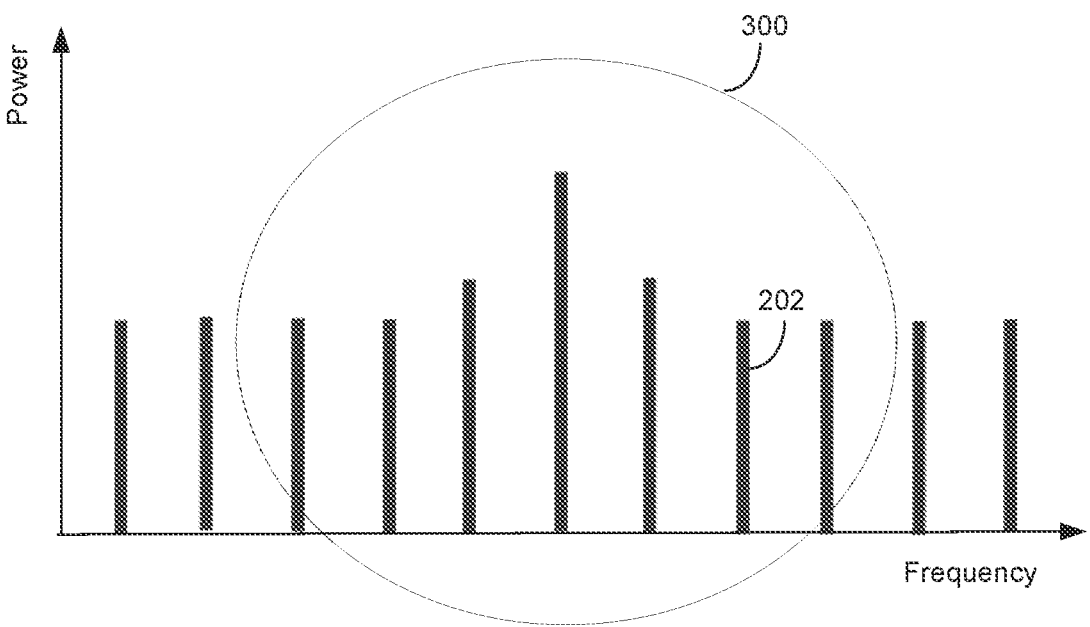
FIG. 2

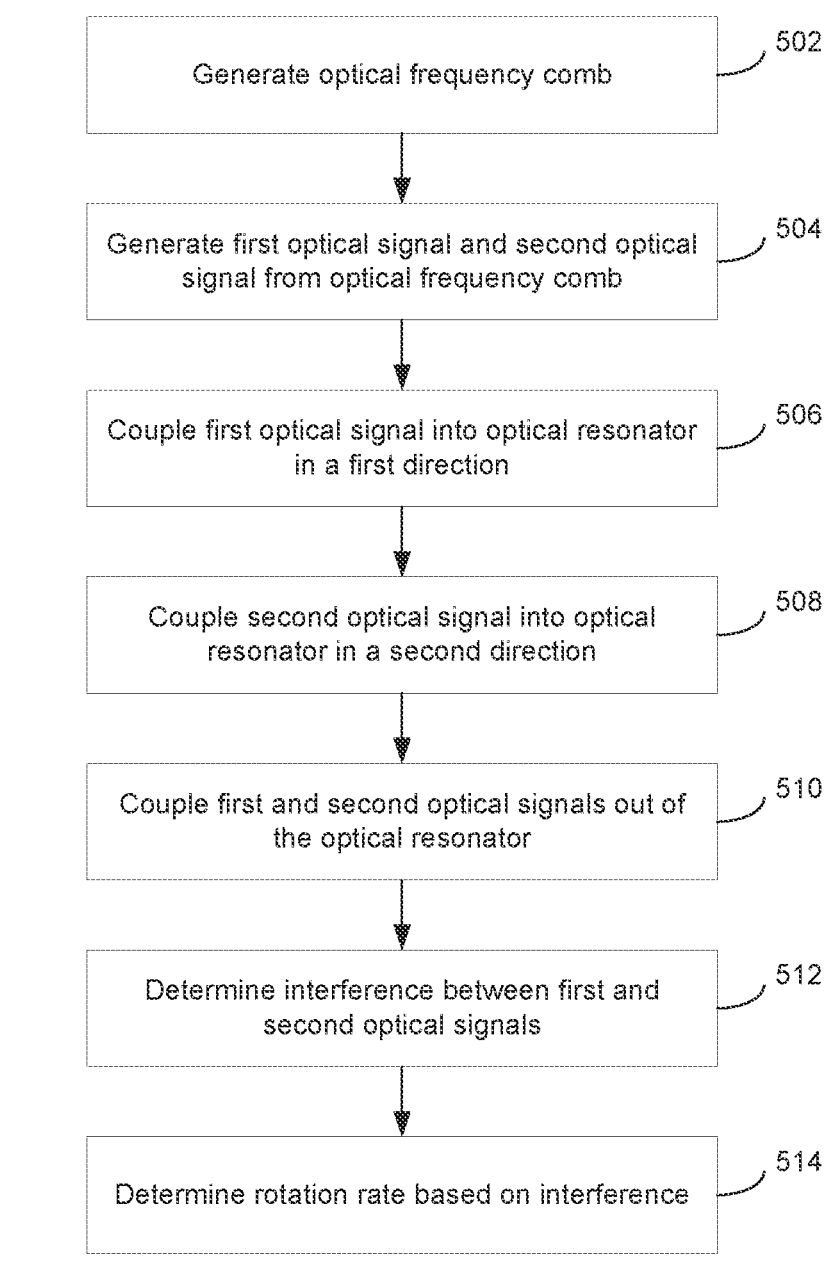

500

| 502 | Generate optical frequency comb |
| 504 | Generate first optical signal and second optical signal from optical frequency comb |
| 506 | Couple first optical signal into optical resonator in a first direction |
| 508 | Couple second optical signal into optical resonator in a second direction |
| 510 | Couple first and second optical signals out of the optical resonator |
| 512 | Determine interference between first and second optical signals |
| 514 | Determine rotation rate based on interference |

INTERFEROMETRIC RESONATOR OPTICAL GYROSCOPE WITH OPTICAL FREQUENCY COMB

STATEMENT REGARDING FEDERALLY SPONSORED RESEARCH OR DEVELOPMENT

This invention was made with Government support under DOTC-19-01-INIT1141 awarded by Army. The Government has certain rights in the invention.

BACKGROUND

Resonator fiber optic gyroscopes (RFOGs) typically utilize narrow linewidth laser sources to generate the optical signals necessary for determining rotation rate measurements. An RFOG generally operates by propagating the optical signals generated by the laser through an optical resonator in counter-propagating directions. The signals output by the optical resonator may be frequency-shifted due to the Sagnac effect when the RFOG experiences a rotation about its sense axis; this frequency-shift between the two output signals can then be used to determine the extent of rotation experienced by the RFOG.

However, signals generated by narrow linewidth lasers are more susceptible to the optical Kerr effect, which is a nonlinear optical phenomenon that modifies the propagation properties of the optical signal as a function of the intensity of the optical signal. As a result of the optical Kerr effect, the optical signals may lose power in the RFOG, thereby contributing to a loss of power efficiency. Additionally, the power loss may be so great that the signals may not be detectable after propagation in the optical resonator.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an interferometric resonator optical gyroscope is disclosed. The interferometric resonator optical gyroscope comprises an optical frequency comb generator configured to generate an optical signal. The optical signal is representative of an optical frequency comb. The interferometric resonator optical gyroscope comprises at least one optical coupler. The at least one optical coupler is configured to split the optical signal into a first optical signal and a second optical signal. The interferometric resonator optical gyroscope comprises an optical resonator coupled to the at least one optical coupler and configured to receive the first optical signal and the second optical signal. The first optical signal propagates through the optical resonator in a first direction. The second optical signal propagates through the optical resonator in a second direction. The interferometric resonator optical gyroscope comprises a rate calculation circuit coupled to the optical resonator. The rate calculation circuit is configured to determine an extent of interference between the first optical signal and the second optical signal. The rate calculation circuit is configured to determine a rotation rate based on the extent of interference.

In one embodiment, a method for operating an interferometric resonator optical gyroscope is disclosed. The method comprises generating, with an optical frequency comb generator, an optical frequency comb. The method comprises transmitting a first optical signal and a second optical signal from the optical frequency comb. The method comprises coupling the first optical signal into an optical resonator in a first direction. The method comprises coupling the second optical signal into the optical resonator in a second direction. The method comprises coupling the first and second optical signals out of the optical resonator. The method comprises determining an extent of interference between the first and second optical signals. The method comprises determining a rotation rate based on the extent of interference.

In yet another embodiment, a program product is disclosed. The program product comprises a non-transitory processor-readable medium on which program instructions configured to be executed by at least one processor are embodied. By executing the program instructions, the at least one processor is configured to receive a signal corresponding to an optical signal after propagating in an optical resonator of an interferometric resonator optical gyroscope. The at least one processor is configured to determine an intensity corresponding to the signal. The at least one processor is configured to determine at least one parameter of an optical frequency comb based on the intensity. The at least one processor is configured to control an optical frequency comb generator of the interferometric resonator optical gyroscope used to generate the optical frequency comb based on the determined at least one parameter.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described herein and as subsequently described in the detailed description.

FIG. 2 depicts a graphical representation of an optical frequency comb, as described in one or more embodiments.

FIG. 5 depicts a flow diagram of a method for operating an interferometric resonator optical gyroscope, as described in one or more embodiments.

Figure 1A:
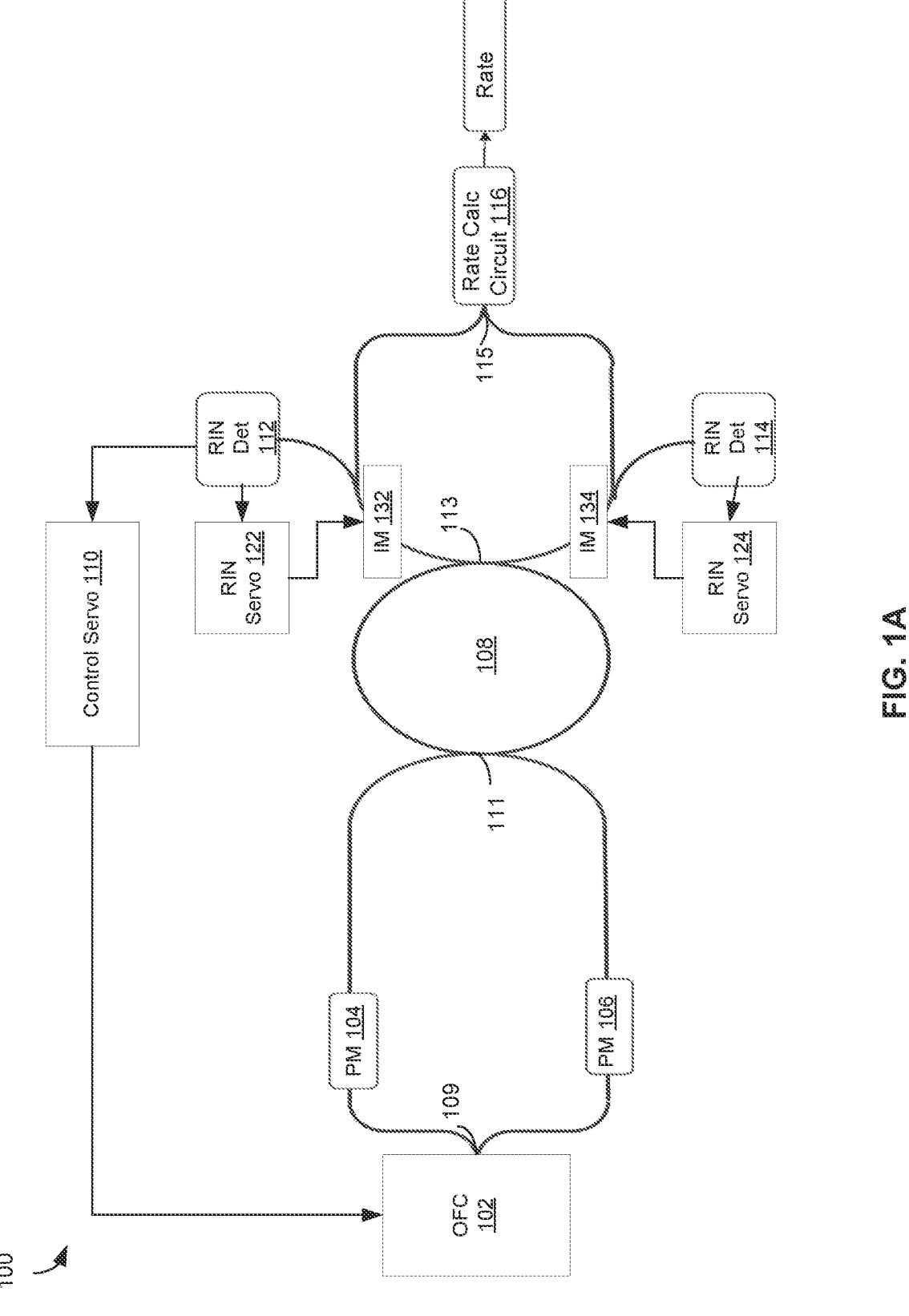
FIGS. 1A-1B depict block diagrams of an interferometric resonator optical gyroscope, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1B:
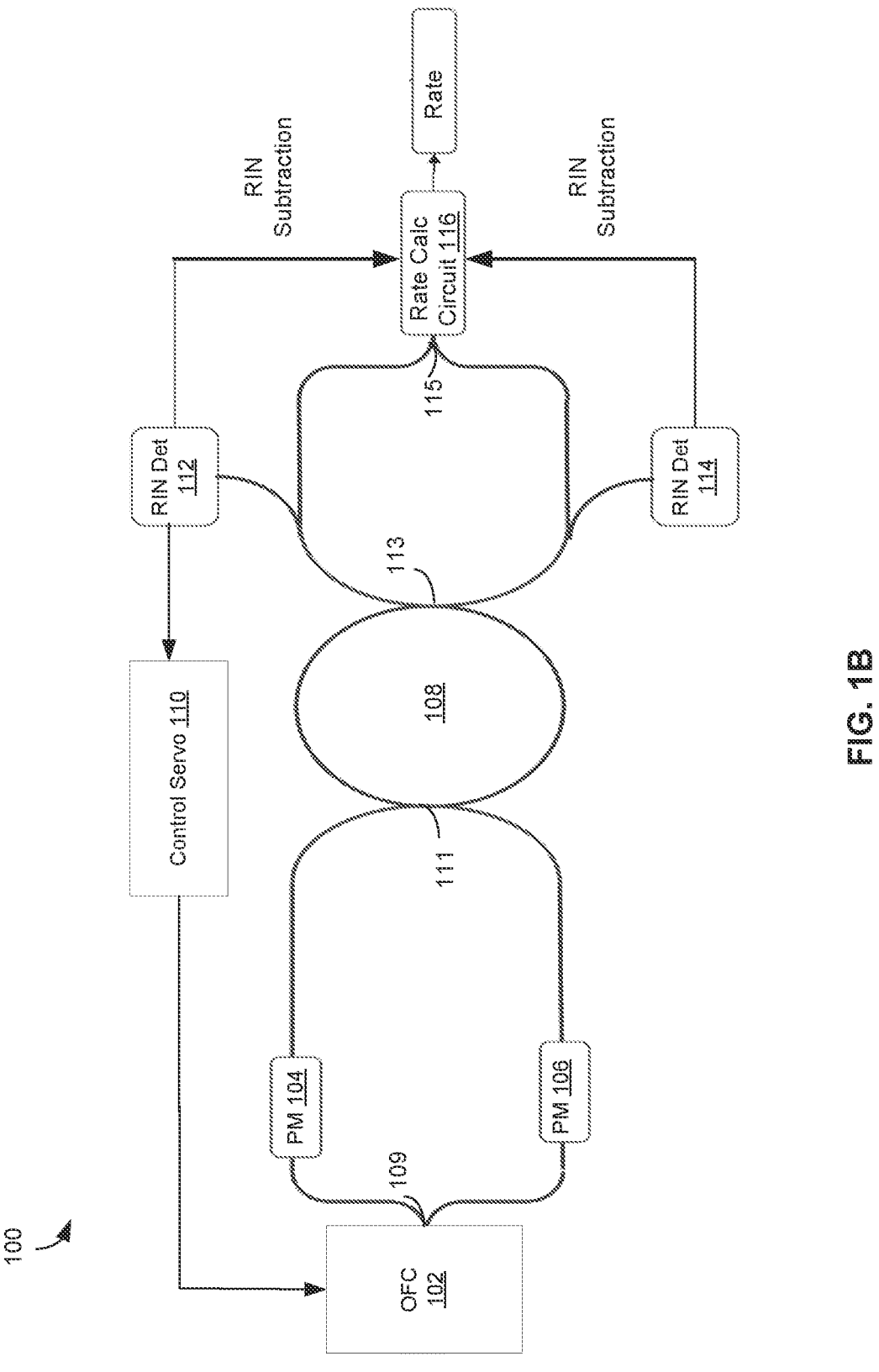

FIGS. 1A-1B depict block diagrams of an interferometric resonator optical gyroscope 100 used to implement the advantages of the present disclosure. As used herein, an "interferometric resonator optical gyroscope" means an optical gyroscope including an optical resonator, in which the interferometric resonator optical gyroscope uses interferometry with interfering optical signals to determine rotation. The interferometric resonator optical gyroscope 100 in the embodiment of FIG. 1 is configured to be implemented on a small-scale chip, such as an integrated photonics chip comprising a suitable substrate material. The components of the interferometric resonator optical gyroscope 100 can be optically coupled through suitable guided optics, such as waveguides, mirrors, beam splitters, and the like. The components of interferometric resonator optical gyroscope 100 are generally connected by optical waveguides for pedagogical explanation, but free space optics may also be used where applicable.

Focusing on the embodiment of FIG. 1A, interferometric resonator optical gyroscope 100 includes an optical frequency comb (OFC) generator 102. The optical frequency comb generator 102 is configured to generate an optical frequency comb that comprises a plurality of optical spectral spikes at different frequencies, with each optical spectral spike of the optical frequency comb referred to herein as an "optical tooth" or simply "tooth". The optical frequency comb generator 102 can be implemented as an electro-optic modulator and/or a Kerr frequency comb generator. Exemplary representations of the output of the optical frequency comb generator 102 are further shown and described with respect to FIGS. 2 and 3A-3B.

The output of the optical frequency comb generator 102 is split (e.g., via an optical waveguide or coupler 109) into a first optical signal and a second optical signal. In the embodiment of FIG. 1A, the interferometric resonator optical gyroscope 100 optionally includes two phase modulators (PM) 104, 106 that respectively modulate the phase of the first and second optical signal based on a phase modulation signal, such as a sinusoidal modulation signal. Specifically, phase modulator 104 modulates the phase of the first optical signal and phase modulator 106 modulates the phase of the second optical signal. By generating phase-modulated optical signals in their respective optical paths, phase modulators 104, 106 can improve the signal-noise ratio of the optical signals that propagate in the interferometric resonator optical gyroscope 100.

Interferometric resonator optical gyroscope 100 additionally includes an optical resonator 108. Optical resonator 108 is configured to extend the effective optical path length of the gyroscope by enabling optical signals to propagate multiple times through the resonator. In doing so, optical resonator 108 is configured to allow optical signals at the resonance frequency to resonate in the resonator. The frequency components of the optical signals that closely match the resonance frequency modes of optical resonator 108 will resonate within the resonator. Consequently, light at those frequencies has a much longer equivalent optical pathlength. In contrast, the frequency components of the optical signals that do not match the resonance frequency modes of optical resonator 108 get reflected at the input coupler 111.

In some embodiments, optical resonator 108 is configured as a 'zero-dispersion' cavity; that is, a resonator that uses waveguide dispersion to compensate for material dispersive effects. For example, the dispersive effects of optical resonator 108 can be tuned by its geometric configuration to shift the dispersive effects of the resonator outside of its bandwidth, or the frequency range of interest. Doing so can reduce the free spectral range variation due to material dispersion in the resonator.

After optional phase modulation is applied, the first and second optical signals are coupled into optical resonator 108 via optical coupler 111 in different directions. The first optical signal output from phase modulator 104 enters optical resonator 108 and propagates in a first direction in multiple roundtrips through optical resonator 108. In the embodiment shown in FIG. 1, the first optical signal propagates in the counterclockwise (CCW) direction. In similar fashion, the second optical signal output from phase modulator 106 enters optical resonator 108 and propagates in a second direction. In the embodiment shown in FIG. 1A, the second optical signal propagates in the clockwise (CW) direction.

When the interferometric resonator optical gyroscope 100 is at rest, the resonance frequency modes in the first and second direction will be identical and hence the components of the first and second optical signals will have the same phase shift. Alternatively stated, the first and second optical signals constructively interfere when the interferometric resonator optical gyroscope 100 undergoes no rotation and the transmitted output power of the resonator is maximized. However, when interferometric resonator optical gyroscope 100 undergoes rotation about its sense axis, the optical path length of optical resonator 108 in one direction shifts relative to the other direction and thus the resonance frequency modes of optical resonator 108 will be different between the two directions. In this case, the first optical signal and the second optical signal have different optical phase delays and may destructively interfere with each other and the resulting transmitted output power of the resonator decreases. The extent of the interference (e.g., the phase shift) between the first optical signal and the second optical signal can be used to determine the rotation rate experienced by interferometric resonator optical gyroscope 100 about its sense axis.

For example, in the embodiment of FIG. 1A, interferometric resonator optical gyroscope 100 includes a rate calculation circuit 116 coupled to the output of optical resonator 108. The first optical signal is configured to be coupled out of optical resonator 108 by optical coupler 113 and received by rate calculation circuit 116. Additionally, rate calculation circuit 116 receives the second optical signal after being coupled out of optical resonator 108. An optical coupler 115 combines the first and second optical signal and provides the combined optical signal to rate calculation circuit 116. Rate calculation circuit 116 is configured to measure the interference and determine the rotation rate experienced by interferometric resonator optical gyroscope 100 based on the interference between the first optical signal and the second optical signal. In some embodiments, rate calculation circuit 116 determines the phase shift of the combined signal, which can be used to determine the extent of rotation.

As shown in FIG. 1A, interferometric resonator optical gyroscope 100 includes relative intensity noise (RIN) servos 122, 124. RIN detector 112 is configured to receive the first optical signal after propagating in the optical resonator 108 and passing through the intensity modulator (IM) 132, while RIN detector 114 receives the second optical signal after propagating in the optical resonator 108 and passing through the intensity modulator 134. RIN servos 122, 124 are configured to reduce the intensity noise of the first or second optical signal. The RIN servos 122, 124 generate correction signals as a function of the intensity noise, which are applied to the intensity modulator 132 and intensity modulator 134, respectively.

The resonance frequency modes of optical resonator 108 can also change during continuous gyroscope operation. For example, environmental parameters such as temperature can affect the refractive index of optical resonator 108, which can cause the resonance frequency modes to change over time. To compensate for this, interferometric resonator optical gyroscope 100 is configured for adaptive locking of the optical frequency comb to the resonance frequency modes of the optical resonator 108 in one direction so that, even when the resonance frequency modes change over time, the optical frequency comb can remain locked to the resonance frequency modes. In the embodiment of FIG. 1A, RIN detector 112 is coupled to a control servo 110. Control servo 110 is configured to control the output of the optical frequency comb generator 102 based on the intensity of the first optical signal (e.g., the CCW signal in FIG. 1A). Generally, control servo 110 uses intensity of the transmitted signal as a reference signal for determining the change of resonance frequency modes of the optical resonator 108 and to frequency lock the output of optical frequency comb generator 102 to optical resonator 108. The use of the CCW signal as illustrated in FIG. 1A as shown for pedagogical explanation understanding that, in other embodiments, the CW signal can be used as the reference optical signal.

The change of intensity e.g., the DC intensity or the intensity at the frequency of PM 104 over time may indicate that the optical frequency comb generated by optical frequency comb generator 102 is no longer locked to optical resonator 108. For example, in FIG. 1A, the intensity detected by RIN detector 112 ideally should correspond to the maximum intensity output by optical resonator 108 as would be expected when the teeth of the optical frequency comb are exactly locked to the resonance frequency modes of optical resonator 108 (see FIGS. 3A-3B). If the resonance frequency modes in the first direction change, however, the intensity detected by RIN detector 112 will decrease from the maximum value because the teeth are no longer exactly locked to the resonance frequency modes. In another embodiment, the intensity of the signal at the frequency that PM 104 is modulated should be equal to zero when all the teeth are exactly locked to the resonance modes of resonator 108.

Hence, control servo 110 can use the change in intensity provided from RIN detector 112 to determine parameters of the optical frequency comb generator 102, and to control the optical frequency comb generator 102 accordingly. For example, control servo 110 can determine the carrier envelope offset (ceo) frequency and repetition rate of the optical frequency comb based on the intensity of the first optical signal. By adjusting the carrier envelope offset frequency, the control servo 110 can shift the optical frequency comb relative to the resonance frequency modes of the optical resonator 108 in the frequency domain. Additionally, the "repetition rate" as used herein refers to the periodic frequency spacing of two successive teeth of the optical frequency comb. By adjusting the repetition rate, the control servo 110 can shift how closely spaced each tooth is relative to each other.

Optical signals generated by broadband sources have a broad range of frequency components, most of which do not correspond to the resonance modes of optical resonator 108, and thus will get reflected. Although optical signals generated by narrow linewidth lasers can be tuned to match the resonance frequencies of optical resonator 108, such signals are more susceptible to the optical Kerr effect, thereby resulting in bias error as a function of the intensity of the signal. By utilizing the tunable optical frequency comb, bias error from the Kerr effect can be reduced in the interferometric resonator optical gyroscope 100 while increasing the transmitted optical power in the first direction of optical resonator 108.

FIG. 1B depicts another embodiment of an interferometric resonator optical gyroscope 100. The interferometric resonator optical gyroscope depicted in FIG. 1B operates similarly as described with respect to interferometric resonator optical gyroscope 100 depicted in FIG. 1A except as otherwise described. In the embodiment of FIG. 1B, RIN detector 112, 114 can also determine other intensity-related parameters from the optical signals, such as the intensity noise associated with each signal, which are optionally used by the rate calculation circuit 116 to determine the rotation rate. For example, rate calculation circuit 116 receives the intensities of the two optical signals from RIN detectors 112, 114 and determines the rotation rate based by subtracting the intensity noise from the interference signal. Since intensity modulation is optional in this embodiment, RIN servos 122, 124 and IM 132, 134 are omitted from FIG. 1B.

FIG. 2 depicts a graphical representation of an optical frequency comb 200 that can be generated by optical frequency comb generator 102. The optical frequency comb 200 is plotted as a function of frequency (horizontal axis), in which the relative power/intensity of the optical frequency comb is represented in the vertical axis. As shown in FIG. 2, the optical frequency comb 200 includes a plurality of spectral peaks 202, each having a distinct peak frequency. These spectral peaks 202 are referred to as the teeth of the optical frequency comb. Each of the optical signals subsequently provided to optical resonator 108 has an intensity and frequency profile represented by optical frequency comb 200.

The representation of the optical frequency comb shown in FIG. 2 is for pedagogical explanation, and not intended to be limiting. For example, optical frequency comb 200 can include any number of teeth 202. Additionally, the relative intensities of each of the teeth 202 can be different from the representation shown in FIG. 2.

As described in the context of FIGS. 1A-1B, the optical frequency comb 200 is tuned to lock on to one of the optical signals (the CCW signal in FIGS. 1A-1B) counterpropagating in optical resonator 108. If the intensity of the optical signal changes, e.g., decreases due to changes in the resonance frequency modes of optical resonator 108, the teeth 202 can be adjusted to be appropriately spaced in frequency to compensate for such changes. As a result, the power efficiency of the optical signals can be improved, which enables reduced optical power requirements in the interferometric resonator optical gyroscope, and can further improve the detection accuracy from shot noise. Because the intensity of the each optical frequency comb tooth 202 is much lower than the power of single frequency laser, bias error caused by the optical Kerr effect can be reduced. Such an effect is particularly advantageous in high-finesse optical resonators for small photonics chip designs.

Figure 3A:
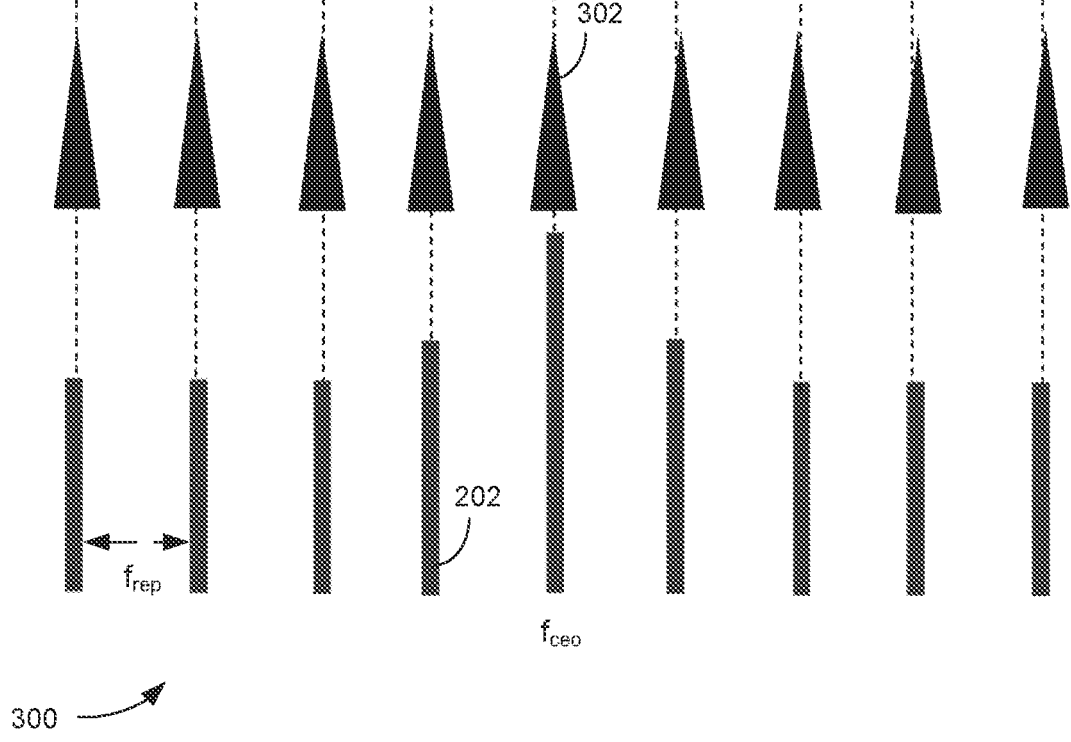
FIGS. 3A-3B depict representations of aligning an optical frequency comb to resonance peaks of an optical resonator, as described in one or more embodiments.
Figure 3B:
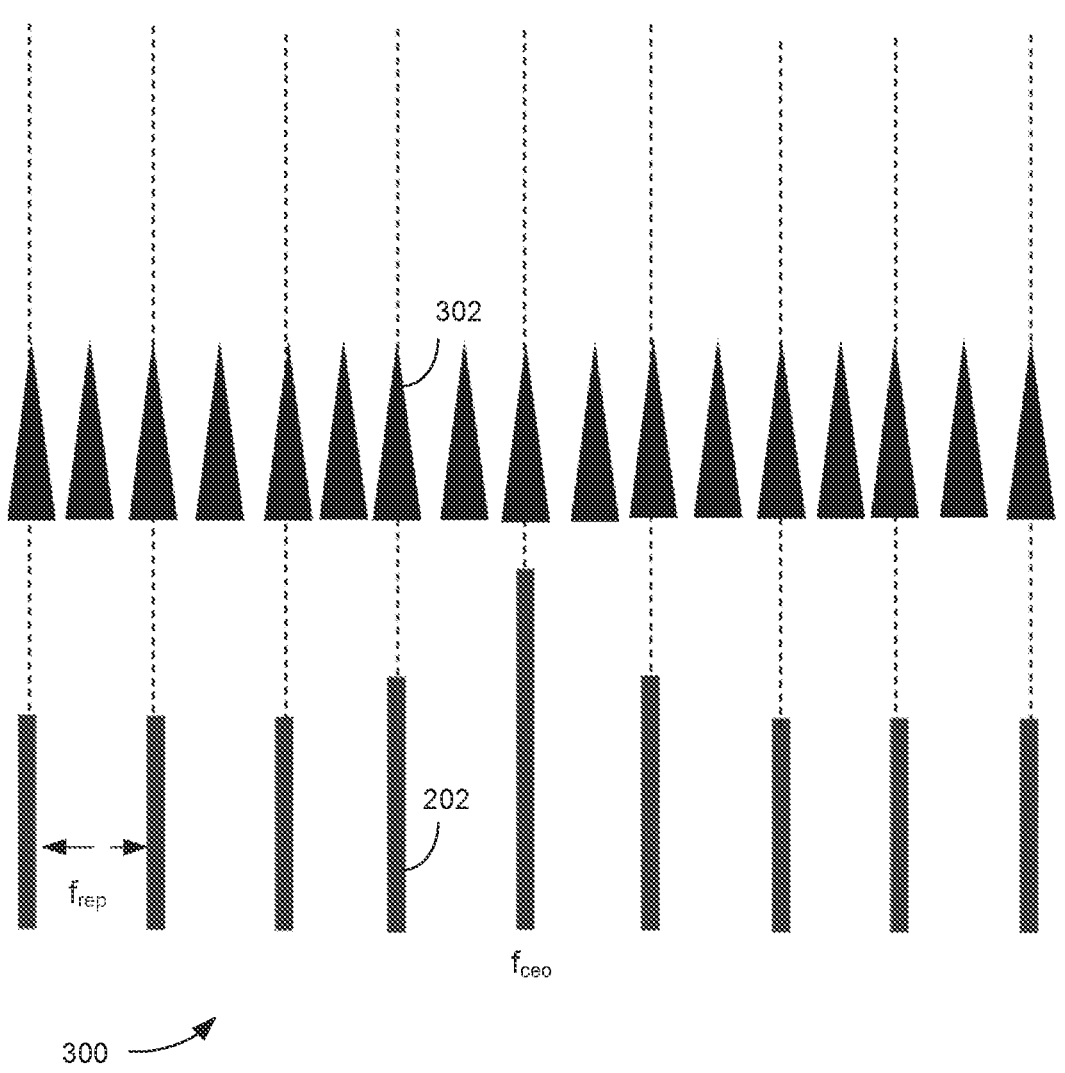

At least a portion 300 of the optical frequency comb 200 is periodically locked to the resonance frequency modes of optical resonator 108. This portion 300 is magnified as shown in FIGS. 3A-3B, which depict two exemplary locking patterns. Referring first to FIG. 3A, each tooth 202 of the optical frequency comb is respectively locked to a resonance frequency peak 302 of optical resonator 108. All the teeth 202 that overlap with the resonance peaks serve as the initial frequency lock of the optical frequency comb 200 to a corresponding resonance peaks 302. The frequency peak of the tooth corresponding to the highest relative intensity is indicated as the carrier envelope offset frequency $f_{ceo}$. By adjusting the carrier envelope offset frequency $f_{ceo}$, the optical frequency comb can be laterally shifted in the frequency domain, which enables the teeth 202 to maintain frequency locking with the corresponding resonance frequency peaks 302 in response to a shift of the resonance frequency peak 302. The repetition rate $f_{rep}$ is also shown in FIG. 3A between two consecutive teeth 202. The separation between two consecutive resonance peaks 302 is called free spectral range (FSR), and in the embodiment of FIG. 3A, the repetition rate $f_{rep}$ is equal to the FSR.

However, the optical frequency comb 200 can be generated in other ways. For example, referring to FIG. 3B, the repetition rate is selected so as to be a multiple integer of the FSR of the optical resonator 108. By adjusting the repetition rate, the frequency spacing of each tooth 202 of the optical frequency comb 200 can be tuned relative to the resonance frequency peaks 302. Alternatively stated, the optical frequency comb 200 can be expanded (by decreasing the repetition rate) or contracted (by increasing the repetition rate) so as to maintain the desired frequency lock to the resonance frequency peaks 302.

Figure 4:
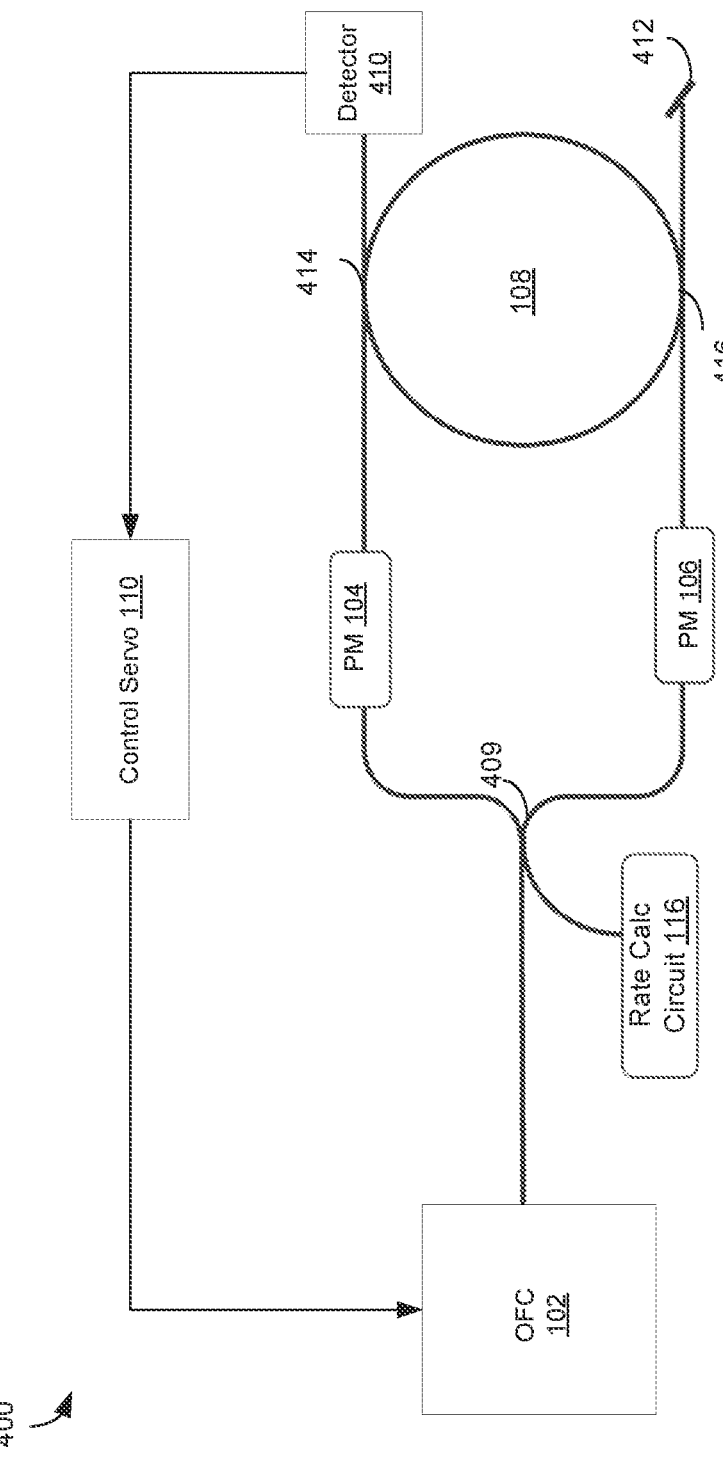
FIG. 4 depicts a block diagram of an interferometric resonator optical gyroscope, as described in one or more embodiments.

FIG. 4 depicts a block diagram of an interferometric resonator optical gyroscope 400. The interferometric resonator optical gyroscope 400 operates similarly as described in FIGS. 1A-1B, including the generation and tuning of the optical frequency comb described in FIGS. 2-3, with some distinctions as will be subsequently described.

In the embodiment of FIG. 4, optical frequency comb generator 102 generates optical signals that are split at optical coupler 409 and fed into respective phase modulators 104, 106. The optical signals couple into, and exit from, the optical resonator 108 at distinct points along the optical path of the resonator. Referring to the first optical signal output from phase modulator 104, the first optical signal enters optical resonator 108 via optical coupler 414 and propagates in the CW direction multiple times in optical resonator 108. The first optical signal exits optical resonator 108 via optical coupler 416 and propagates back towards phase modulator 106 and ultimately to optical coupler 409.

The second optical signal propagates through interferometric resonator optical gyroscope 400 in a similar manner. It is phase modulated by phase modulator 106 and a portion of the second optical signal enters optical resonator 108 via optical coupler 416. In the embodiment of FIG. 4, second optical signal propagates in optical resonator 108 in the CCW direction multiple times, and exits the optical resonator via optical coupler 414. From there, it passes through phase modulator 104 and back to optical coupler 409. A small portion of the second optical signal may not couple into optical resonator 108 and instead propagates to optical isolator 412. Optical isolator 412 is configured to prevent back-reflection of the portion of the second optical signal that does not couple into optical resonator 108. For example, optical isolator 412 can be a waveguide with large angle at the edge of the chip implementing the interferometric resonator optical gyroscope, in which the large angle prevents the second optical signal from being reflected back to optical coupler 416 (referred to as "angle-output").

After exiting optical resonator 108, the first optical signal and the second optical signal are combined at optical coupler 409. In the embodiment of FIG. 4, optical coupler 409 provides the combined first and second optical signals to rate calculation circuit 116 via a distinct optical path. Rate calculation circuit 116 determines the extent of interference between the first and second optical signals (e.g., the phase shift), and determines the rotation rate experienced by interferometric resonator optical gyroscope 400 based on the interference between the two signals, if any.

Interferometric resonator optical gyroscope 400 is configured to tune and lock the optical frequency comb based on the intensity of the first optical signal (the CW optical signal in FIG. 4). While most of the first optical signal propagates through optical resonator 108 and exits via optical coupler 416, a portion of the first optical signal exits via optical coupler 414 and is detected by a detector 410, which can be implemented as part of RIN detector 112 but can also be implemented as a standalone detector. Detector 410 is configured to convert the optical signal to an electrical signal based on the intensity of the optical signal and provides the electrical signal to control servo 110. Control servo 110 is configured to adjust parameters of optical frequency comb generator 102 based on the intensity of the first optical signal. In some embodiments, control servo 110 locks teeth of the optical frequency comb 200 to resonance frequency peaks of optical resonator 108 and the repetition rate to correspond to a periodic spacing of the resonance frequency peaks in the frequency domain.

Control servo 110 can determine the parameters to tune optical frequency comb generator 102 in different ways. In contrast to the intensity received by RIN detector 112 in FIG. 1A, which corresponds to the transmitted optical power of the first optical signal, the signal received by detector 410 corresponds to the reflected optical power of the first optical signal. Accordingly, if the optical frequency comb is perfectly locked to the resonance modes of optical resonator 108, the power output would be minimized at detector 410. If detector 410 detects an increase in the power output of the first optical signal (indicating a shift in the resonance modes), then control servo 110 tunes optical frequency comb generator 102 to compensate for the increase in reflected power detected at detector 410.

FIG. 5 depicts a flow diagram of a method 500 for operating an interferometric resonator optical gyroscope. Method 500 may be implemented via the techniques described with respect to FIGS. 1-4, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 500 includes generating an optical frequency comb at block 502. Referring to FIGS. 1A-1B and 4, the optical frequency comb can be generated by the optical frequency comb generator 102, embodied as a Kerr frequency comb generator or electro-optic modulator, as examples.

Method 500 proceeds from block 502 to block 504 and generates a first optical signal and a second optical signal from the optical frequency comb. For example, the optical frequency comb generator 102 can generate an optical signal that is subsequently split into two signals by an optical coupler or other guided optics. Optionally, the first optical signal and the second optical signal are phase modulated.

Next, method 500 couples the first optical signal into the optical resonator in a first direction at block 506. The first direction can be the CW or the CCW direction. For example, the first optical signal can be coupled into the optical resonator via at least one optical coupler. Subsequently, or in parallel, method 500 also couples the second optical signal into the optical resonator in a second direction at block 508. The second direction can be the other of the CW or the CCW direction. As an example, the second optical signal can be coupled into the optical resonator by the same optical coupler used to couple the first optical signal (see FIG. 1), or a different optical coupler (see FIG. 4).

At block 510, method 500 couples the first and second optical signals out of the optical resonator. The first and second optical signals propagate multiple times in the resonator at the resonance frequency modes of the resonator that correspond to the direction of travel. In particular, the first optical signal resonates at the resonance frequency modes of the optical resonator in the first direction, while the second optical signal resonates at the resonance frequency modes of the optical resonator in the second direction. If the resonance frequency mode of the optical resonator shifts with respect to one of the directions, the optical power and phase of the first and/or optical signals may change due to the absorption and dispersive properties of the optical resonator as a function of frequency.

Method 500 then proceeds to block 512 and determines the extent of interference between the first and second optical signals. For example, the first and second optical signals can be combined after propagating in the optical resonator and provided to at least one processor configured to determine the phase shift between the first and second optical signals. At block 514, method 500 proceeds by determining the rotation rate based on the interference between the first and second optical signals.

Figure 6A:
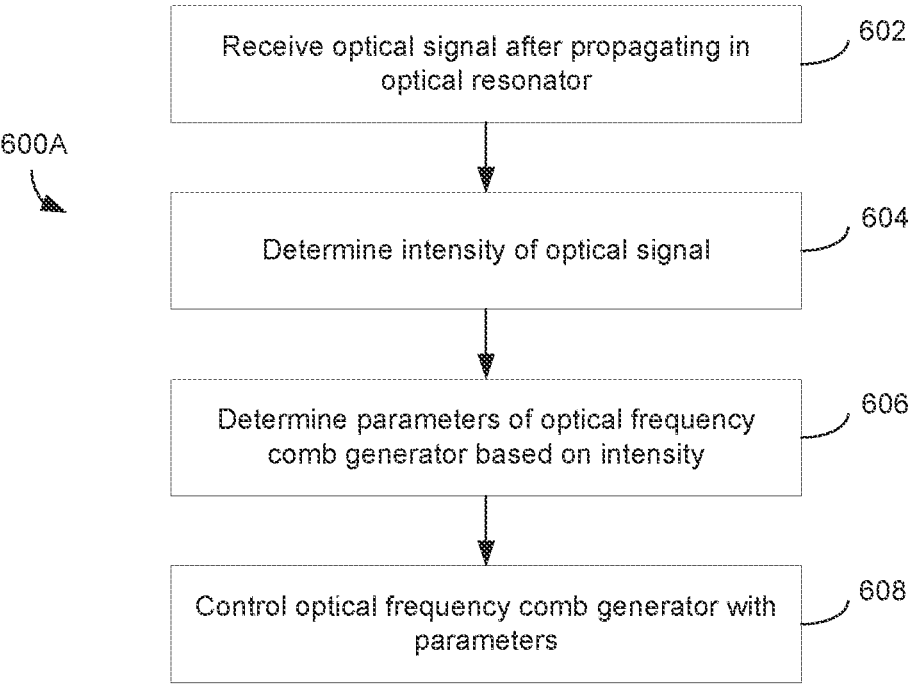
FIGS. 6A-6B depict flow diagrams of methods for tuning an optical frequency comb generator of an interferometric resonator optical gyroscope, as described in one or more embodiments.
Figure 6B:
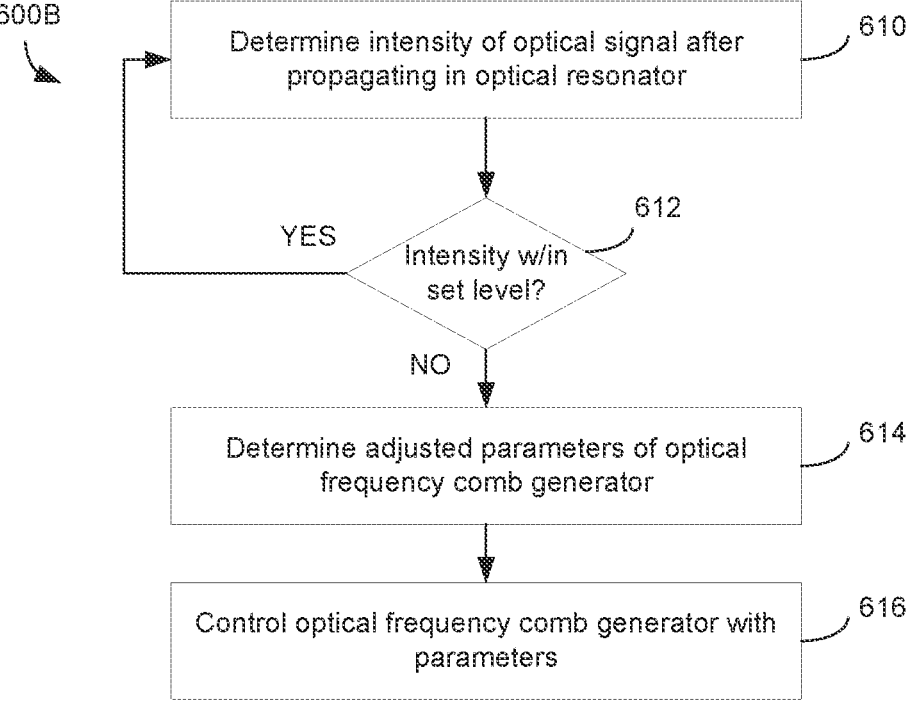

FIGS. 6A-6B depict flow diagrams of methods for tuning an optical frequency comb generator of an interferometric resonator optical gyroscope. The functions of methods 600A-600B can be performed via the techniques described in FIGS. 1-5, and the functions of FIG. 6A can be combined with FIG. 6B (and vise-versa). In some embodiments, the functions of FIGS. 6A-6B can be performed by a control servo 110 as shown and described in FIGS. 1 and 4, or other control and/or processing circuitry comprising at least one processor.

Method 600A includes receiving an optical signal (e.g., the first optical signal) after propagating in the optical resonator at block 602. This function can be performed by the RIN detector 112 of FIGS. 1A-1B or the detector 410 of FIG. 4, in combination with the control servo 110. Proceeding to block 604, method 600A determines an intensity of the optical signal, e.g., the first optical signal. As used in this disclosure, an "intensity" can be represented to also encompass intensity-related parameters, such as power (both optical and electrical), intensity changes at modulation frequency, intensity noise, and other such parameters. As described with respect to FIG. 1, the intensity may be a transmitted power of the optical signal after propagating through the optical resonator (see FIGS. 1A-1B), a transmitted optical power at a frequency that the optical signal is modulated by (e.g., a phase modulator) before entering the optical resonator, or can be a reflected power of the optical signal (see FIG. 4).

At block 606, method 600A determines one or more parameters of the optical frequency comb generator based on the intensity of the optical signal. For example, the parameters can include the carrier envelope offset frequency used to lock a selected tooth of the comb to a corresponding resonance frequency peak of the optical resonator. Such parameters can also include the repetition rate of the optical frequency comb generated by the optical frequency comb generator. Other parameters of the optical frequency comb generator can be determined.

Proceeding to block 608, method 600A controls the optical frequency comb generator with the parameters determined in block 606. For example, controlling the optical frequency comb generator includes generating and sending one or more control signals that configure the optical frequency comb generator to tune the optical frequency comb with the parameters. In doing so, the optical frequency comb generator maintains frequency lock to the resonance frequency modes of the optical resonator, thereby improving the power efficiency and, in some embodiments, the detection of the interferometric resonator optical gyroscope.

FIG. 6B depicts a flow diagram of a method 600B for adjusting the configuration of the optical frequency comb generator, which can be combined with the functions of method 600A and the techniques of FIGS. 1-5. Method 600B includes determining an intensity of an optical signal after propagating in the optical resonator at block 610, similar to block 604 of method 600A. Method 600A then determines whether the intensity is within a set level at block 612. In some embodiments, the set level is represented as a threshold level, such as an intensity ceiling/maximum (in the case of the interferometric resonator optical gyroscope 400 of FIG. 4), or an intensity floor/minimum (in the case of the interferometric resonator optical gyroscope 100 of FIGS. 1A-1B). In some embodiments, the set level is represented as an allowable intensity range. The set level can be defined in other ways to indicate that the resonance frequency modes of the optical resonator have shifted (or have not) relative to the optical frequency comb.

If the intensity of the optical signal is within the set level at block 612, then method 600B reverts back to block 610 and the process can be repeated. If the intensity of the optical signal is not within the set level, then at block 614 method 600B determines one or more adjusted parameters of the optical frequency comb generator in response. Similar to method 600A, the adjusted parameters can include an adjusted carrier frequency and an adjusted repetition rate of the optical frequency comb generated by the optical frequency comb generator. At block 616, method 600B controls the optical frequency comb generator with the adjusted parameters, similarly as described with respect to method 600A.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EE-PROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes an interferometric resonator optical gyroscope, comprising: an optical frequency comb generator configured to generate an optical signal, wherein the optical signal is representative of an optical frequency comb; at least one optical coupler, wherein the at least one optical coupler is configured to split the optical signal into a first optical signal and a second optical signal; an optical resonator coupled to the at least one optical coupler and configured to receive the first optical signal and the second optical signal, wherein the first optical signal propagates through the optical resonator in a first direction, wherein the second optical signal propagates through the optical resonator in a second direction; and a rate calculation circuit coupled to the optical resonator, wherein the rate calculation circuit is configured to: determine an extent of interference between the first optical signal and the second optical signal; and determine a rotation rate based on the extent of interference.

Example 2 includes the interferometric resonator optical gyroscope of Example 1, comprising a first phase modulator and a second phase modulator coupled to the at least one optical coupler, wherein the first phase modulator and the second phase modulator are respectively configured to modulate a phase of the first optical signal and the second optical signal; and to provide the first optical signal and the second optical signal to the optical resonator.

Example 3 includes the interferometric resonator optical gyroscope of any of Examples 1-2, comprising: a control servo comprising at least one processor coupled to the optical frequency comb generator, wherein the control servo is configured to: determine at least one parameter of the optical frequency comb generator based on an intensity of the first optical signal or the second optical signal, and control the optical frequency comb generator based on the at least one parameter.

Example 4 includes the interferometric resonator optical gyroscope of Example 3, comprising a first relative intensity noise (RIN) detector and a second RIN detector coupled to the optical resonator, wherein the first RIN detector is configured to receive the first optical signal after propagating in the optical resonator, and to determine an intensity of the first optical signal, wherein the second RIN detector is configured to receive the second optical signal after propagating in the optical resonator, and to determine an intensity of the second optical signal, wherein one of the first RIN detector and the second RIN detector is configured to provide the intensity of the first optical signal or the second optical signal to the control servo.

Example 5 includes the interferometric resonator optical gyroscope of any of Examples 3-4, comprising a detector coupled to the control servo, wherein the detector is configured to: receive the first optical signal or the second optical signal; convert the first optical signal or the second optical signal to an electric signal; and provide the electric signal to the control servo, wherein the control servo is configured to control the optical frequency comb generator based on an intensity of the electric signal.

Example 6 includes the interferometric resonator optical gyroscope of any of Examples 1-5, wherein the at least one optical coupler is configured to: receive the first optical signal and the second optical signal after propagating in the optical resonator; combine the first optical signal and the second optical signal; and provide the combined optical signal to the rate calculation circuit.

Example 7 includes the interferometric resonator optical gyroscope of any of Examples 1-6, wherein the extent of interference is a phase shift between the first optical signal and the second optical signal, wherein the rate calculation circuit is configured to determine the rotation rate based on the phase shift.

Example 8 includes a method for operating an interferometric resonator optical gyroscope, the method comprising: generating, with an optical frequency comb generator, an optical frequency comb; transmitting a first optical signal and a second optical signal from the optical frequency comb; coupling the first optical signal into an optical resonator in a first direction; coupling the second optical signal into the optical resonator in a second direction; coupling the first and second optical signals out of the optical resonator; determining an extent of interference between the first and second optical signals; determining a rotation rate based on the extent of interference.

Example 9 includes the method of Example 8, further comprising: determining at least one parameter of the optical frequency comb generator based on an intensity of the first optical signal or the second optical signal; and controlling the optical frequency comb generator based on the at least one parameter.

Example 10 includes the method of Example 9, wherein determining at least one parameter comprises determining a carrier envelope offset frequency and a repetition rate of the optical frequency comb, and further comprises tuning the optical frequency comb based on the carrier envelope offset frequency and the repetition rate.

Example 11 includes the method of any of Examples 9-10, wherein determining at least one parameter comprises determining a repetition rate of the optical frequency comb, and further comprising: setting the repetition rate of the optical frequency comb to a free spectral range of the optical resonator or an integer multiple of the free spectral range.

Example 12 includes the method of any of Examples 8-11, further comprising: determining an intensity of the first optical signal or the second optical signal after propagating in the optical resonator; determining that the intensity is outside a set level; determining adjusted parameters of the optical frequency comb in response to determining that the intensity is outside the set level; and controlling the optical frequency comb generator with the adjusted parameters.

Example 13 includes the method of any of Examples 8-12, wherein generating an optical frequency comb comprises generating an optical frequency comb with a Kerr frequency comb generator or a single frequency laser coupled with an electro-optic modulator.

Example 14 includes the method of any of Examples 8-13, wherein generating an optical frequency comb comprises: generating an optical signal having a single frequency; and generating the optical frequency comb from the optical signal having the single frequency.

Example 15 includes a program product comprising a non-transitory processor-readable medium on which program instructions configured to be executed by at least one processor are embodied, wherein by executing the program instructions, the at least one processor is configured to: receive a signal corresponding to an optical signal after propagating in an optical resonator of an interferometric resonator optical gyroscope; determine an intensity corresponding to the signal; determine at least one parameter of an optical frequency comb based on the intensity; and control an optical frequency comb generator of the interferometric resonator optical gyroscope used to generate the optical frequency comb based on the determined at least one parameter.

Example 16 includes the program product of Example 15, wherein the intensity corresponds to one of: (1) a transmitted optical power of the signal after propagating in a first direction in the optical resonator; (2) a transmitted optical power at a frequency that the optical signal is modulated by before entering the optical resonator; or (3) a reflected optical power of the signal after propagating in the first direction in the optical resonator.

Example 17 includes the program product of any of Examples 15-16, wherein the at least one parameter comprises a carrier envelope offset frequency and a repetition rate of the optical frequency comb.

Example 18 includes the program product of any of Examples 15-17, wherein by executing the program instructions, the at least one processor is configured to: determine whether the intensity is outside a set level; determine an adjusted carrier envelope offset frequency and repetition rate of the optical frequency comb in response to determining that the intensity is outside the set level; and control the optical frequency comb generator with the adjusted carrier envelope offset frequency and repetition rate.

Example 19 includes the program product of any of Examples 17-18, wherein by executing the program instructions, the at least one processor is configured to: set the repetition rate of the optical frequency comb to a free spectral range of the optical resonator or an integer multiple of the free spectral range.

Example 20 includes the program product of any of Examples 15-19, wherein to control the optical frequency comb generator comprises to send one or more control signals that configure an output of the optical frequency comb generator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An interferometric resonator optical gyroscope, comprising:
   an optical frequency comb generator configured to generate an optical signal, wherein the optical signal is representative of an optical frequency comb;
   at least one optical coupler, wherein the at least one optical coupler is configured to split the optical signal into a first optical signal and a second optical signal;
   an optical resonator coupled to the at least one optical coupler and configured to receive the first optical signal and the second optical signal, wherein the first optical signal propagates through the optical resonator in a first direction, wherein the second optical signal propagates through the optical resonator in a second direction; and
   a rate calculation circuit coupled to the optical resonator, wherein the rate calculation circuit is configured to:
      determine phase shift between the first optical signal and the second optical signal; and
      determine a rotation rate based on the phase shift;
   a control servo comprising at least one processor coupled to the optical frequency comb generator, wherein the control servo is configured to:
      determine at least one parameter of the optical frequency comb generator based on an intensity noise of the first optical signal or the second optical signal, and
      control the optical frequency comb generator based on the at least one parameter;
   a first relative intensity noise (RIN) detector and a second RIN detector coupled to the optical resonator;
   wherein the first RIN detector is configured to receive the first optical signal after propagating in the optical resonator, and to determine the intensity noise of the first optical signal;
   wherein the second RIN detector is configured to receive the second optical signal after propagating in the optical resonator, and to determine the intensity noise of the second optical signal;
   wherein one of the first RIN detector and the second RIN detector is configured to provide the intensity noise of the first optical signal or the second optical signal to the control servo.

2. The interferometric resonator optical gyroscope of claim 1, comprising a first phase modulator and a second phase modulator coupled to the at least one optical coupler, wherein the first phase modulator and the second phase modulator are respectively configured to modulate a phase of the first optical signal and the second optical signal; and to provide the first optical signal and the second optical signal to the optical resonator.

3. The interferometric resonator optical gyroscope of claim 1, comprising a detector coupled to the control servo, wherein the detector is configured to:
   receive the first optical signal or the second optical signal;
   convert the first optical signal or the second optical signal to an electric signal; and
   provide the electric signal to the control servo, wherein the control servo is configured to control the optical frequency comb generator based on an intensity of the electric signal.

4. The interferometric resonator optical gyroscope of claim 1, wherein the at least one optical coupler is configured to:
   receive the first optical signal and the second optical signal after propagating in the optical resonator;
   combine the first optical signal and the second optical signal; and
   provide the combined optical signal to the rate calculation circuit.

5. A method for operating an interferometric resonator optical gyroscope, the method comprising:
   generating, with an optical frequency comb generator, an optical frequency comb;
   transmitting a first optical signal and a second optical signal from the optical frequency comb;
   coupling the first optical signal into an optical resonator in a first direction;

coupling the second optical signal into the optical reso-
nator in a second direction;

coupling the first and the second optical signals out of the
optical resonator;

determining a phase shift between the first and the second
optical signals;

determining a rotation rate based on the phase shift;

determining an intensity of the first optical signal or the
second optical signal after propagating in the optical
resonator;

determining that the intensity is outside a set level;

determining adjusted parameters of the optical frequency
comb in response to determining that the intensity is
outside the set level; and controlling the optical frequency comb generator with the
adjusted parameters.

6. The method of claim 5, further comprising:

determining at least one parameter of the optical fre-
quency comb generator based on the intensity of the
first optical signal or the second optical signal; and controlling the optical frequency comb generator based on
the at least one parameter.

7. The method of claim 6, wherein determining the at least
one parameter comprises determining a carrier envelope
offset frequency and a repetition rate of the optical frequency
comb, and further comprises tuning the optical frequency
comb based on the carrier envelope offset frequency and the
repetition rate.

8. The method of claim 6, wherein determining the at least
one parameter comprises determining a repetition rate of the
optical frequency comb, and further comprising:

setting the repetition rate of the optical frequency comb to
a free spectral range of the optical resonator or an
integer multiple of the free spectral range.

9. The method of claim 5, wherein generating the optical
frequency comb comprises generating an optical frequency
comb with a Kerr frequency comb generator or a single
frequency laser coupled with an electro-optic modulator.

10. The method of claim 5, wherein generating the optical
frequency comb comprises:

generating an optical signal having a single frequency;
and generating the optical frequency comb from the optical
signal having the single frequency.

* * * * *